United States Patent Office 3,116,771
Patented Jan. 7, 1964

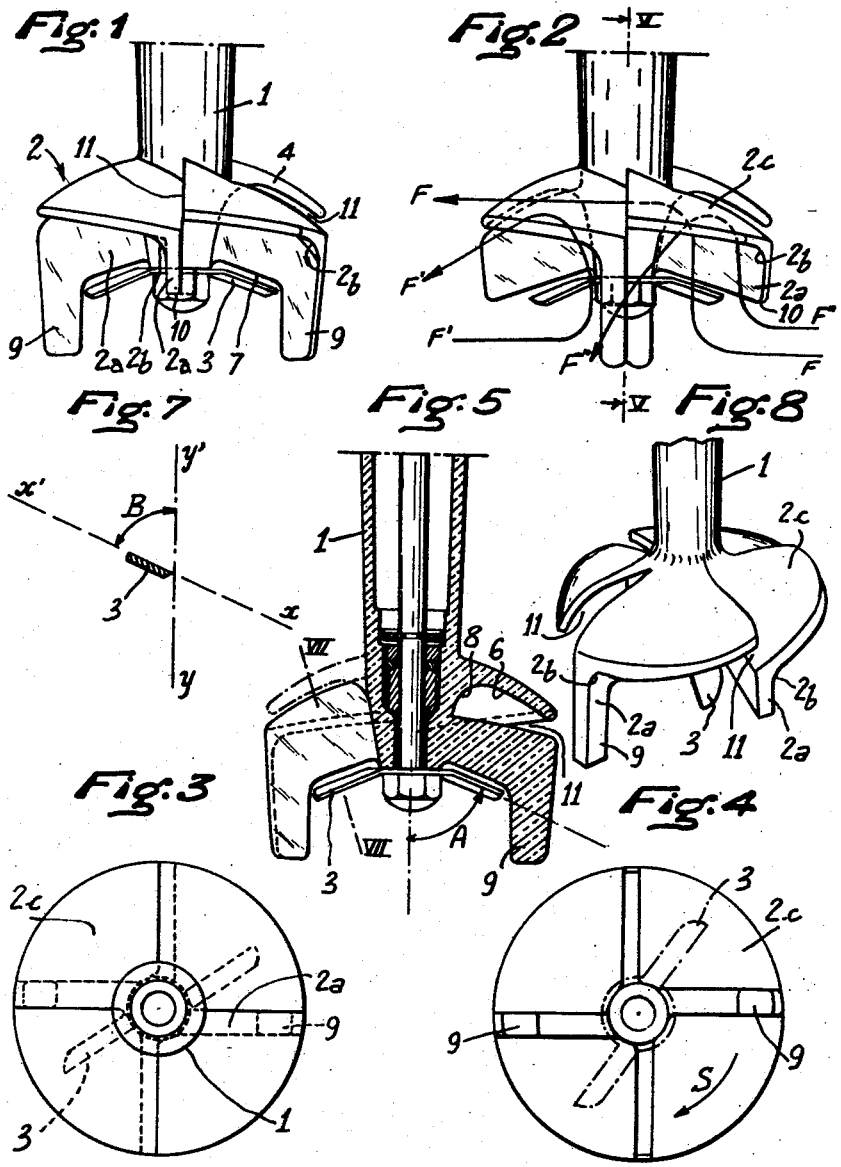

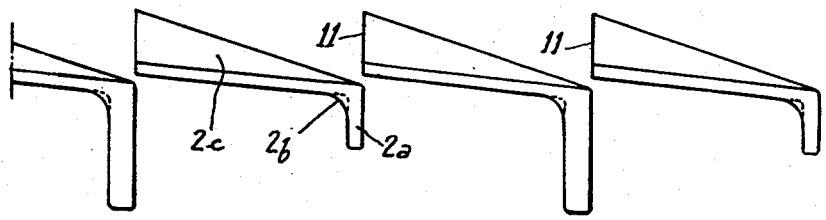
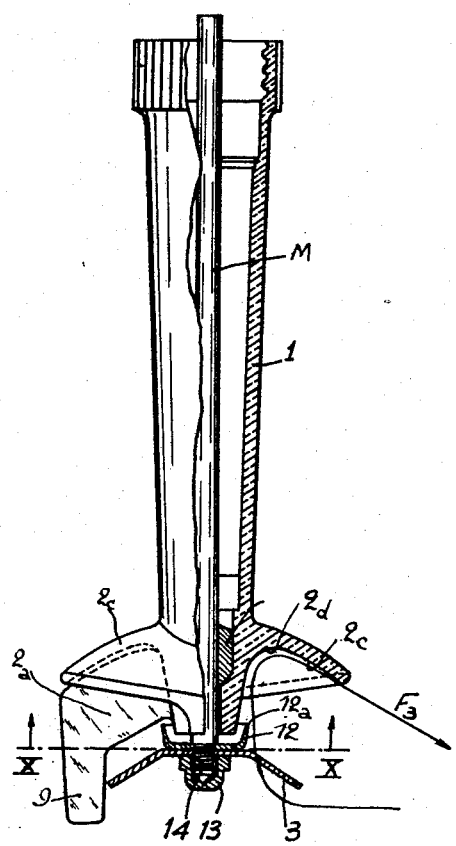
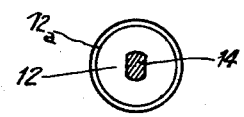

3,116,771
BREAKING UP AND STIRRING APPARATUS PROVIDED WITH DEFLECTING BLADES
Jean Mantelet, Paris, France, assignor to Societe d'Etudes & d'Exploitation Chimie & Mecanique E.C.E.M. Moulinex, Bagnolet, France, a joint stock company
Filed May 29, 1961, Ser. No. 113,211
Claims priority, application France June 3, 1960
9 Claims. (Cl. 146—68)

The present invention has for its object an improvement in so-called mixers, that is in apparatus for breaking up and stirring, of the type including a motor housed inside a casing provided with a tubular extension through which the motor shaft extends, so as to carry at its outer end a rotary tool adapted to be immersed inside a liquid preparation containing possibly solid particles to be comminuted.

In such apparatus, the rotary tool revolves at a very high speed, of a magnitude of 10,000 to 20,000 r.p.m. and it has a tendency to carry along in its rotation the liquid preparation inside which it is immersed, whereby it produces in the vicinity of the tool a whirl which reduces considerably the efficiency of the apparatus, while centrifugal force urges the liquid towards the periphery of its container, which leads in its turn to a risk of said liquid overflowing out of the latter.

The present invention has for its object a breaking up and stirring apparatus of this type, including a motor housed inside a casing extending into a tubular body, carrying at its outer end a plurality of substantially radial and uniformly distributed blades, said tubular body carrying the motor shaft the outer end of which is rigid with an impeller revolving between the blades on said body and designed so as to propel the liquid upwardly; now, according to the invention, said blades extend into the immediate proximity of the path of the impeller and include a rising surface of a substantially helical low-pitch shape, the radial cross-section of which has its concavity facing the impeller and extends in a direction opposed to the direction of rotation of the latter and transversely with reference to said tubular body, at least up to a point in substantial registry with the adjacent blade. This provides between this helical surface of one blade and the upper surface of the main section of the adjacent blade an elongated passageway through which the elementary liquid jets are propelled upwardly through the impeller and are deflected in a direction opposed to the rotation of the latter by the helical surface of the first-mentioned blade, so as to be urged outwardly in the shape of a sheet extending substantially across the axis of rotation, which prevents the drive of the liquid preparation into rotation with the impeller and hinders thus the formation of a whirl.

The accompanying drawings illustrate a number of embodiments of such an apparatus by way of example. In said drawings:

FIG. 1 is a front elevational view of the end, adjacent the impeller of the tubular body, of a bladed mixer according to the invention.

FIG. 2 is a side elevational view thereof.

FIG. 3 is a plan view of the apparatus as seen from above.

FIG. 4 is a plan view as seen from below, the impeller being illustrated in dot-and-dash lines in said FIGS. 3 and 4.

FIG. 5 is a partly sectional view through line V—V of FIG. 2 and a partly elevational view.

FIG. 6 is a partly developed view of the blading.

FIG. 7 is a cross-section of the impeller through line VII—VII of FIG. 5.

FIG. 8 is a perspective view of the arrangement.

FIG. 9 is a partly elevational partly sectional view of a modification.

FIG. 10 is a cross-section through line X—X of FIG. 9.

In FIGS. 1 to 8, 1 designates the tubular body of which the free end is provided with four deflecting blades 2 which are uniformly distributed over its periphery and of which the section nearest the impeller forms a substantially radial section 2a extending into immediate proximity with the path followed by the impeller 3, so as to cooperate with the latter through the edge 7 in the shearing of the particles suspended in the liquid. The radial sections 2a of the blades are incurved at their upper ends 2b so as to show a concavity facing away from the direction of rotation of the impeller, said sections 2a merging into the helical sections 2c. The latter, which are bounded by substantially parallel surfaces, slope each upwardly in a direction opposed to the direction of rotation of the impeller between its inner edge at 2b up to its outer edge 4, which is substantially radial and located in registry with the radial section 2a of the following blade, whereby there is provided between any two successive blades and in registry with said outer edges 4 an elongated passageway 11 through which the small liquid jets are exhausted along a plane extending transversely with reference to the axis of rotation.

The radial cross-section of each section 2c shows a concavity 6 facing the impeller and merging at 8 into the end of the tubular body 1 along a smooth curve.

The vanes 3 of the impeller are each provided with a rectilinear leading edge alined with a point of the axis, so as to slope downwardly and to describe a cone, the half apical angle of which, A, approximates 70° (FIG. 5), while the plane xx' of each vane forms with the radial plane yy' (FIG. 7) containing the leading edge, an angle B which also approximates 70°.

Two of the four stationary blades which are diametrically opposed, are provided with extensions 9 forming protecting feet on which the apparatus stands, said feet cooperating with the lower outer ends 10 of the two other diametrically opposed blades, so as to prevent any contact between the impeller and the walls of the liquid-filled container.

When the tubular body is immersed inside the liquid preparation and the motor is started, the impeller urges the liquid upwardly so that the latter has a tendency to rotate in the same direction as the impeller. This tendency is counteracted by the radial sections 2a opposing such a rotation and guiding the elementary liquid jets towards the upper sections of the blades where they are deflected in a direction opposed to the rotation of the impeller, by the incurved parts 2b, after which said jets are guided by the substantially helical sections 2c. A fraction of said liquid jets is then urged outwardly through the elongated passageways 11 in the shape of four tangential sheets extending transversely of the axis and facing a direction opposed to the direction of rotation of the impeller, so as to oppose the rotation of the liquid mass. The remaining liquid jets flow out along the periphery of the upper sections 2c of the blades and form a sheet directed towards the bottom of the container.

In FIG. 2 are illustrated the paths followed by three small liquid jets F, F', F''. The jet F, after it has been deflected by the blade, is exhausted in the direction opposed to the rotation of the impeller, which latter revolves in the direction of the arrow S illustrated in FIG. 4, so that said jet passes through the elongated passageway 11, while the elementary jets F' and F'' are directed downwardly over the upper outer edge of the same blades.

In the case where the liquid preparation to be homogenized carries solid particles, such as particles of vegetables, suspended in the liquid, said particles would be sheared between the blades of the impeller and the lower edges 7 of the blades in the immediate vicinity of which they are urged into rotation.

In the embodiment illustrated in FIGS. 9 and 10, the driving shaft M terminates with a threaded lower end 14 provided with flat longitudinal surfaces and over which are fitted through openings of a corresponding shape a cup 12 provided with a cutting ridge 12a and the impeller 3 held in position by a blind nut 13. The ridge 12a of the cup which lies at a short distance from the lower edges 2a of the blades cooperates with the latter so as to produce a shearing of fibrous vegetables which have a tendency to wind over the end of the shaft M or of the tubular body 1.

It will be remarked that the inner surfaces of the sections 2c have a radius of curvature which is comparatively large and merges into the end of the tubular body through a very marked curve 2d. Thus, the liquid jets F3 which are guided over a comparatively long distance, produce at their exhaust points a non-eddying sheet under laminary conditions, which oppose any projection which might be produced upon introduction or removal of the head of the mixer inside the liquid or out of the latter without the impeller being stopped.

What I claim is:

1. An apparatus for breaking up and stirring a liquid preparation, comprising a vertical tubular casing, a shaft revolvably carried in the casing, an impeller rigid with the lower end of said shaft, and including a plurality of vanes sloping downwardly and having their leading edges alined with a point of the rotary axis of the revolvable shaft, said leading edges of the vanes forming an angle of about 70° with said axis, and the plane of each vane forming an angle of about 70° with the plane passing through the leading edge of the vane and parallel with the axis of the shaft, and a plurality of blades uniformly distributed along and rigid with the lower end of the casing and including each a substantially radial section extending substantially throughout the space separating the lower end of the casing from the volume defined by the rotary impeller and a further section merging into and rising above the upper edge of the radial section in a direction opposed to the direction of rotation of the shaft and impeller, substantially in the shape of a helical surface of a reduced pitch and extending at least up to the plane of the radial section of the adjacent blade, the radial cross-section of said further section having a downwardly turned concavity.

2. An apparatus for breaking up and stirring a liquid preparation, comprising a vertical tubular casing, a shaft revolvably carried in the casing, an impeller rigid with the lower end of said shaft, and a plurality of blades uniformly distributed along and rigid with the lower end of the casing and including each a substantially radial section slightly spaced with a radial gap with reference to the casing, extending substantially throughout the space separating the lower end of the casing from the volume defined by the rotary impeller, and a further section merging into and rising above the upper edge of the radial section in a direction opposed to the direction of rotation of the shaft and impeller, substantially in the shape of a helical surface of a reduced pitch, extending at least up to the plane of the radial section of the adjacent blade, the radial cross-section of said further section having a downwardly turned concavity, and merging into the radial cross-section of the casing through an arcuate line having a radius of curvature increasing from the casing outwardly, and an upwardly flaring cup secured to the lower end of the shaft and provided with an upper cutting edge engaging the gap between the lower end of the casing and the inner edges of the radial sections of the blades to cooperate with the latter in the shearing of any solid particle of the liquid preparation.

3. In an apparatus for breaking up and stirring a liquid preparation, in combination,
impeller means rotatable about an axis in one direction for propelling during rotation the liquid in a spirally and upwardly directed stream about said axis; and
stationary blade means having at least one blade section extending in substantially radial and upward direction being located in the path of said stream, and at least one transverse blade section connected to an upper edge of the first mentioned section and having an inner surface directed toward said impeller means and extending gradually rising from said edge in a direction opposite to the direction of rotation of said impeller means, whereby part of the stream produced by said impeller means will be intercepted by the first mentioned stationary blade section and deflected by said transverse blade section in a direction opposite to the direction produced by said impeller means.

4. In an apparatus for breaking up and stirring a liquid preparation, in combination,
impeller means rotatable about an axis in one direction for propelling during rotation the liquid in a spirally and upwardly directed stream about said axis; and
stationary blade means having at least one blade section extending in substantially radial and upward direction being located in the path of said stream, and at least one transverse blade section connected to an upper edge of the first mentioned section and having an inner helicoidal surface directed toward said impeller means and extending gradually rising from said edge in a direction opposite to the direction of rotation of said impeller means, whereby part of the stream produced by said impeller means will be intercepted by the first mentioned stationary blade section and deflected by said transverse blade section in a direction opposite to the direction produced by said impeller means.

5. In an apparatus for breaking up and stirring a liquid preparation, in combination,
impeller means rotatable about an axis in one direction for propelling during rotation the liquid in a spirally and upwardly directed stream about said axis; and
stationary blade means having at least one blade section extending in substantially radial and upward direction being located in the path of said stream, and at least one transverse blade section connected to an upper edge of the first mentioned section and having an inner helicoidal surface directed toward said impeller means and extending gradually rising from said edge in a direction opposite to the direction of rotation of said impeller means, said inner surface being in radial direction concavely curved toward said impeller means, whereby part of the stream produced by said impeller means will be intercepted by the first mentioned stationary blade section and deflected by said transverse blade section in downward direction and circumferentially in a direction opposite to the direction produced by said impeller means.

6. In an apparatus for breaking up and stirring a liquid preparation, in combination,
impeller means rotatable about an axis in one direction for propelling during rotation the liquid in a spirally and upwardly directed stream about said axis; and
stationary blade means having a plurality of blades angularly uniformly distributed about said axis and each of said blades including one blade section extending in substantially radial and upward direction being located in the path of said stream, and one transverse blade section connected to an upper edge of the first mentioned section and having an inner surface directed toward said impeller means and extending gradually rising from said edge in a direction opposite to the direction of rotation of said impeller means, whereby part of the stream produced by said impeller means will be intercepted by the first mentioned stationary blade section and deflected by said transverse blade section in a direction opposite to the direction produced by said impeller means.

7. In an apparatus for breaking up and stirring of liquid preparation, in combination, impeller means rotatable about an axis in one direction for propelling during rotation the liquid in a spirally and upwardly directed stream about said axis; and stationary blade means having a plurality of blades angularly uniformly distributed about said axis and each of said blades including one blade section extending in substantially radial and upward direction being located in the path of said stream, and one transverse blade section connected to an upper edge of the first mentioned section and having an inner surface directed toward said impeller means and extending gradually rising from said edge in a direction opposite to the direction of rotation of said impeller means at least up to the plane of the radially and upwardly extending section of the adjacent blade, whereby part of the stream produced by said impeller means will be intercepted by the first mentioned stationary blade section and deflected by said transverse blade section in a direction opposite to the direction produced by said impeller means.

8. An apparatus for breaking up and stirring a liquid preparation comprising, in combination, a vertical tubular casing;

a shaft carried in said casing for rotation relative thereto in one direction about its axis and having a lower end extending beyond said casing;

impeller means fixed to said shaft for rotation therewith in said one direction for propelling during rotation the liquid in a spirally and upwardly directed stream about said axis; and a plurality of blades angularly uniformly distributed about said axis and each of said blades including a first blade section extending substantially radially and upwardly substantially parallel to said axis and being located in the path of said stream, said first blade section having a lower edge portion closely adjacent to upper edge portions of said impeller means and an upper edge, and a second blade section connected to said upper edge of said first blade section and having an inner helicoidal surface directed toward said impeller means and extending gradually rising from said upper edge of said first blade section in a direction opposite to the direction of rotation of said impeller means, said inner surface being in radial direction concavely curved toward said impeller means and blending into the lower end of said casing along a curved surface having a radius of curvature increasing in outward direction, whereby part of the stream produced by said impeller means will be intercepted by said first stationary blade section and deflected by said second transverse blade section in downward direction and circumferentially in a direction opposite to the direction of rotation of said impeller means.

9. An apparatus for breaking up and stirring a liquid preparation comprising, in combination, a vertical tubular casing;

a shaft carried in said casing for rotation relative thereto in one direction about its axis and having a lower end extending beyond said casing;

impeller means fixed to said shaft for rotation therewith in said one direction for propelling during rotation the liquid in a spirally and upwardly directed stream about said axis; and stationary blade means fixed to said casing and having at least one blade section extending substantially radially and upwardly substantially parallel to said axis and being located in the path of said stream, said one blade section having a lower edge portion closely adjacent to upper edge portions of said impeller means and an upper edge, and at least one transverse blade section connected to said upper edge of said first mentioned blade section and having an inner surface directed toward said impeller means and extending gradually rising from said upper edge in a direction opposite of the direction of rotation of said impeller means, whereby part of the stream produced by said impeller means will be intercepted by the first mentioned stationary blade section and deflected by said transverse blade section in a direction opposite to the direction produced by said impeller means.

References Cited in the file of this patent

UNITED STATES PATENTS

| 2,570,078 | Spremulli | Oct. 2, 1951 |
| 2,964,301 | Bosse | Dec. 13, 1960 |

FOREIGN PATENTS

| 544,754 | Italy | June 19, 1956 |